(12) United States Patent
Nakamura et al.

(10) Patent No.: US 6,627,342 B1
(45) Date of Patent: Sep. 30, 2003

(54) EVAPORATOR LIQUID FUEL INJECTION APPARATUS AND FUEL CELL SYSTEM

(75) Inventors: Masahito Nakamura, Saitama (JP); Takahiro Tachihara, Saitama (JP); Kouji Miyano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 141 days.

(21) Appl. No.: 09/714,104

(22) Filed: Nov. 17, 2000

(30) Foreign Application Priority Data

Nov. 18, 1999 (JP) ............................. 11-327628

(51) Int. Cl.$^7$ ...................... H01M 8/04; G05D 23/00; F22B 1/02
(52) U.S. Cl. ....................... 429/26; 429/12; 429/120; 422/198; 422/109; 122/31.1; 122/37
(58) Field of Search .................. 429/26, 17, 120; 73/118.1; 123/445, 447, 510, 524, 514, 516, 557, 446, 506; 137/15.7, 51; 60/267; 122/31.1, 37, 23, 414; 422/198, 109, 110

(56) References Cited

U.S. PATENT DOCUMENTS 4,499,871 A * 2/1985 Neitz et al. ................. 123/276

FOREIGN PATENT DOCUMENTS

JP      A-2000-319002      11/2000

OTHER PUBLICATIONS

RD 423046, Jul. 1999.*

\* cited by examiner

*Primary Examiner*—Stephen Kalafut
*Assistant Examiner*—R Alejandro
(74) *Attorney, Agent, or Firm*—Arent Fox Kinter Plotkin & Kahn, PLLC

(57) ABSTRACT

A fuel evaporator 1 is provided in a fuel cell system FCS having an evaporating chamber that evaporates liquid fuel into fuel gas by heat medium gas. The fuel evaporator is provided with a liquid fuel injection apparatus 40 that injects liquid fuel into the evaporating chamber and an injection volume adjusting apparatus 42 that adjusts the injection volume of the liquid fuel injection apparatus. The injection volume adjusting apparatus 42 includes an injection volume adjusting portion that sets the fuel injection volume according to an injection volume target setting signal.

7 Claims, 8 Drawing Sheets

EVAPORATOR LIQUID FUEL INJECTION APPARATUS AND FUEL CELL SYSTEM

FIELD OF THE INVENTION

The present invention relates to an evaporator liquid fuel injection apparatus and fuel cell system, and particularly it relates to an evaporator liquid fuel injection apparatus and fuel cell system whereby appropriate volumes of liquid fuel can be injected based on the requirements for a fuel cell-powered electric vehicle.

BACKGROUND OF THE INVENTION

Electric vehicles have become well known in recent years as vehicles driven by electrical power sources, and fuel cell-powered electric vehicles are being developed that employ fuel cells as the power source. Some fuel cells used in such fuel cell-powered electric vehicles employ so-called methanol-reformed fuel cells. In such fuel cells, a liquid fuel composed of a mixture of methanol and water, for example, is used and a fuel evaporator is provided which evaporates the liquid fuel and supplies it to a reformer.

The present applicant has disclosed a fuel evaporator for such types of fuel cells in the prior art in Japanese Patent Application No. Hei-1-125366. With reference to FIG. 8, the fuel evaporator 100 is provided with an evaporating chamber 110 wherein liquid fuel FL is evaporated by heated gas HG produced at a combustor (not illustrated) to produce fuel gas FG. The fuel gas FG produced at the evaporating chamber 110 is supplied to a superheating chamber 120 where it is superheated by heated gas HG exiting the evaporating chamber 110. The evaporating chamber 110 and superheating chamber 120 are connected via a guide channel 130 formed along the floor side 110A of the evaporating chamber 110.

In the evaporating chamber 110 there are situated a plurality of U-shaped heat medium tubes 111, 111 . . . through which heated gas HG passes, and the heated gas HG is conveyed toward the guide channel 130. The liquid fuel FL is injected by the liquid fuel injection apparatus 140 toward the heat medium tubes 111, 111 . . . in the evaporating chamber 110. The liquid fuel FL injected by the liquid fuel injection apparatus 140 contacts with the heat medium tubes 111, 111 . . . and undergoes heat exchange to be evaporated. The fuel gas FG produced by evaporation of the liquid fuel FL is supplied to a plurality of vapor tubes 121, 121 . . . situated in the superheating chamber 120.

Meanwhile, the heated gas HG flowing out from the heat medium tubes 111, 111 . . . is supplied to the superheating chamber 120 via the guide channel 130. In the superheating chamber 120, the fuel gas FG passing through the vapor tubes 121, 121 . . . is superheated by the heated gas HG supplied to the superheating chamber 120. The superheated fuel gas FG then flows out from each of the vapor tubes 121, 121 . . . and is supplied to a reformer (not illustrated).

Incidentally, since the pressure in the evaporating chamber varies depending on the effects of adjustment of the anode-cathode pressure difference in the fuel cell, it is difficult to maintain a constant pressure in the evaporating chamber. When liquid fuel is freely injected under conditions where the pressure in the evaporator is not constant, it becomes impossible for the liquid fuel to evenly spread in the evaporating chamber and the efficiency of the liquid fuel evaporation is reduced.

In the aforementioned conventional fuel evaporator 100, however, no particular consideration is made to the relationship between the pressure in the evaporating chamber 110 and the injection volume of the liquid fuel. Consequently, the liquid fuel is simply injected in a volume based on the requirements of a fuel cell-powered electric vehicle.

On the other hand, fuel cell-powered electric vehicles sometimes require rapid huge current for the main motor for times of rapid acceleration and the like. In such situations it is desirable for the huge current to be supplied from the fuel cell as rapidly as possible, but supply of a huge current from the fuel cell requires a large volume of fuel gas. Production of a large volume of fuel gas requires injection of a large volume of liquid fuel and a large amount of heat for evaporation of the large volume of liquid fuel.

In the conventional fuel evaporator 100 described above, however, it is easy to inject a large volume of liquid fuel rapidly but it is not possible to supply a large amount of heat necessary to evaporate the liquid fuel. Consequently, the large volume of liquid fuel cannot be rapidly evaporated, and not only is it impossible to supply the fuel gas rapidly to the fuel cell, but this also results in liquid pools.

It is therefore an object of the present invention to allow efficient evaporation of liquid fuel by injection of a suitable amount of liquid fuel matching the requirements of fuel cells.

It is another object to achieve this even when huge current must be rapidly supplied in situations of rapid acceleration of fuel cell-powered electric vehicles, while also efficiently evaporating supplied liquid fuel and thus preventing liquid pools in the evaporating chamber.

SUMMARY OF THE INVENTION

According to a first aspect of the invention, there is provided an evaporator liquid fuel injection apparatus for a fuel evaporator in a fuel cell system, having an evaporating chamber that evaporates liquid fuel with a high temperature heat medium into fuel gas, comprising:

a liquid fuel injection apparatus for injecting said liquid fuel into said evaporating chamber;

an injection volume adjusting apparatus for adjusting the injection volume of the liquid fuel injection apparatus; and a fuel volume adjusting portion provided in said injection volume adjusting apparatus for setting the liquid fuel injection volume based on an injection volume target setting signal.

With such a construction, an injection volume adjusting portion is provided which sets the fuel injection volume based on an injection volume target setting signal. Consequently, since a suitable volume of liquid fuel can be injected to meet the requirements of the fuel cell, it is possible to efficiently evaporate the liquid fuel.

According to a second aspect of the invention, the aforementioned evaporator liquid fuel injection apparatus is characterized in that said fuel evaporator is provided with a pressure detection means for detecting the pressure in the evaporating chamber, and said injection volume adjusting portion receives a command value from said pressure detection means and corrects said liquid fuel injection volume.

With such a construction, the pressure in the evaporator is detected by the pressure detection means and the fuel injection volume is corrected according to the command value from the pressure detection means. It is therefore possible to appropriately adjust the injection volume of the liquid fuel according to the pressure conditions in the evaporator. Consequently, the fuel injection volume can be appropriately adjusted even when fluctuations occur in the pressure inside the evaporator.

According to a third aspect of the invention, the aforementioned evaporator liquid fuel injection apparatus is characterized in that said fuel cell system is used in a fuel cell-powered electric vehicle, and said injection volume target setting signal is an accelerator angle signal.

With such a construction, when the fuel cell system is used in a fuel cell-powered electric vehicle, the injection volume target setting signal is an accelerator angle signal. It is therefore possible to adjust the fuel injection volume according to the accelerator angle, which fluctuates with time in a fuel cell-powered electric vehicle.

According to a fourth aspect of the invention, the aforementioned evaporator liquid fuel injection apparatus is characterized in that said injection volume adjusting portion receives a residue signal from an energy buffer and corrects said liquid fuel injection volume.

With such a construction, the fuel injection volume is corrected by the energy buffer residue signal. In a fuel cell-powered electric vehicle, the required electric power load is supplied not only from the fuel cell but also from an energy buffer such as a battery. Thus, when a large residue is present in the energy buffer, for example, the current supplied from the fuel cell may be reduced. Adjustment is therefore made possible for correction to reduce the fuel injection volume when the current supplied from the fuel cell is to be reduced.

According to a fifth aspect of the invention, the aforementioned evaporator liquid fuel injection apparatus is characterized in that said injection volume adjusting portion corrects said liquid fuel injection volume based on a regeneration signal.

With such a construction, the fuel injection volume is corrected based on a regeneration signal. In a fuel cell-powered electric vehicle, a current is supplied from the main motor to the energy buffer when the main motor is in a regenerating state. Consequently, when it is in a regenerating state, it is possible to reduce the current supplied from the fuel cell. Moreover, since the current supplied from the fuel cell can be reduced during the regenerating state, adjustment is allowed for correction to reduce the fuel injection volume.

According to a sixth aspect of the invention, there is provided a fuel cell system which has a fuel evaporator with an evaporating chamber for evaporation of liquid fuel into fuel gas with a high temperature heat medium, supplies a part of said liquid fuel gas to a fuel cell and supplies the rest together with off gas to said fuel evaporator, the fuel cell system being characterized in that a fuel utilization volume adjusting means is provided so as to adjust the utilization volume of the liquid fuel gas at the fuel cell, the liquid fuel gas being supplied from said fuel evaporator to the fuel cell according to an injection volume target setting signal, said fuel evaporator is provided with a liquid fuel injection apparatus for injecting liquid fuel to said evaporating chamber and an injection volume adjusting apparatus for adjusting the injection volume of said liquid fuel injection apparatus, wherein said injection volume adjusting apparatus is provided with an injection volume adjusting portion which supplies a predetermined liquid fuel injection volume based on an injection volume target setting signal, and when the injection volume target setting signal increases, the utilization volume of the liquid fuel gas at the fuel cell is reduced with said fuel utilization volume adjusting means and thus increasing the liquid fuel gas in said off gas, and an energy buffer compensates for the amount of power lacking due to the decreased utilization volume of said fuel gas while said liquid fuel injection volume is increased with said injection volume adjusting portion.

With such as construction, there is provided a fuel utilization volume adjusting means that adjusts the utilization volume in the fuel cell of the fuel gas supplied to the fuel cell from the fuel evaporator according to an injection volume target setting signal. Consequently, when huge current must be rapidly supplied in a situation of rapid acceleration of a fuel cell-powered electric vehicle, it is possible to temporarily reduce the utilization volume of fuel gas in the fuel cell. Also, an amount of fuel gas equivalent to the reduced fuel utilization volume is supplied to the evaporator together with of f gas in order to increase the amount of heat in the evaporator and achieve rapid evaporation of the large volume of liquid fuel. Since increasing the amount of heat in the evaporator allows rapid evaporation of a large volume of liquid fuel, it is possible to rapidly supply a large volume of fuel gas to the fuel cell.

Here, the current supplied from the fuel cell to the main motor is temporarily insufficient, but the energy buffer can compensate the insufficiency. It can therefore provide satisfactory performance even when it is desired to rapidly supply fuel to the fuel cell in a situation such as rapid acceleration of a fuel cell-powered electric vehicle. Moreover, the supplied liquid fuel can be efficiently evaporated and liquid pools in the evaporating chamber can be prevented.

DESCRIPTION OF THE PREFERRED EMBODIMENTS

Preferred embodiments of the invention will now be explained in detail with reference to the attached drawings.

Before explaining the evaporator liquid fuel injection apparatus of the invention, a brief description will be given in regard to the fuel cell system as a whole.

Figure 1:
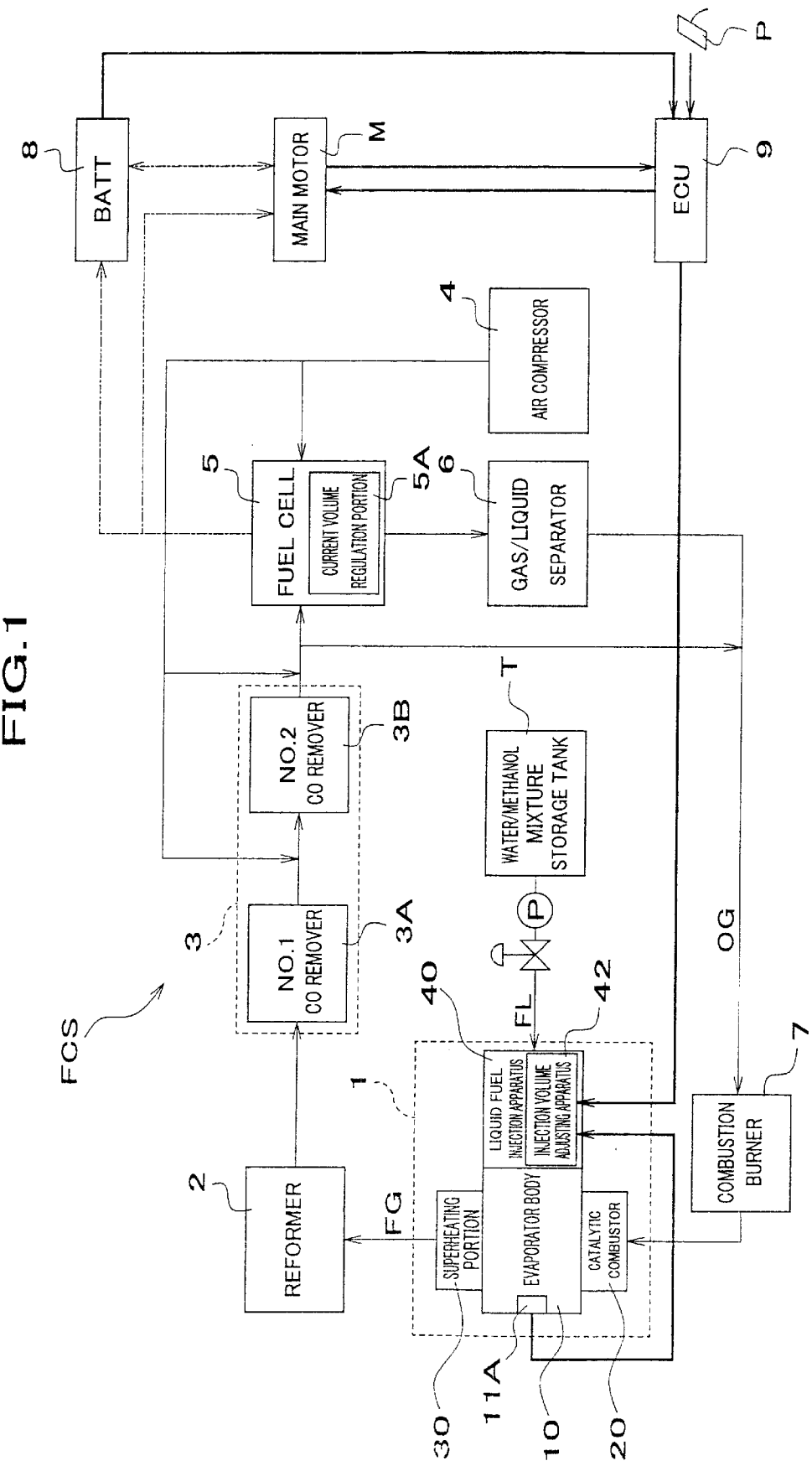
FIG. 1 is a constructional diagram of the overall construction of a fuel cell system provided with an evaporator liquid fuel injection apparatus according to the invention.

FIG. 1 is a constructional diagram of an entire fuel cell system provided with an evaporator liquid fuel injection apparatus according to the invention. As shown in FIG. 1, the fuel cell system FCS includes a fuel evaporator 1 according to the invention. The fuel evaporator 1 has an evaporator body 10, a catalytic combustor 20, a superheating portion 30 and a liquid fuel injection apparatus 40, the structures of which will be described in detail below.

In the fuel evaporator 1, the liquid fuel, which is a water/methanol mixture, is supplied from a tank T and the liquid fuel is evaporated to produce fuel gas. The fuel gas produced by the fuel evaporator 1 is supplied to a reformer 2. At the reformer 2, hydrogen-rich gas is produced from the fuel gas and is supplied to a CO remover 3. At the CO remover 3, the unwanted carbon monoxide gas contained in the supplied hydrogen-rich gas is removed by a NO.1 CO remover 3A and NO.2 CO remover 3B. Separately, an air compressor 4 is provided in the fuel cell system FCS, and air from the air compressor 4 is fed to the CO remover 3.

The hydrogen-rich gas, from which the CO remover 3 has removed the unwanted carbon monoxide gas, is supplied to the fuel cell 5. Air is also supplied from the air compressor 4 to the fuel cell 5. The hydrogen-rich gas and oxygen-containing air are reacted in the fuel cell 5 to obtain electricity. A current volume regulation portion 5A is also provided in the fuel cell 5 and the volume of current generated at the fuel cell 5 is regulated by the current volume regulation portion 5A.

Gas containing unevaporated hydrogen in the fuel cell 5 is supplied to a gas/liquid separating apparatus 6, and the remaining hydrogen gas (hereunder referred to as "off gas") OG is drawn out and supplied to the fuel evaporator 1 to be used as a heat source. A combustion burner 7 is used prior to warming up of the catalytic combustor 20 of the fuel evaporator 1, such as when the motor is started. The current obtained from the fuel cell 5 is fed to the main motor M through a high pressure distributor or PCU (Power Control Unit) (not illustrated), and is used as a driving source for a fuel cell-powered electric vehicle.

An energy buffer battery 8 is also provided in the fuel cell system FCS, and it supplies an appropriate current to compensate the current supplied from the fuel cell 5, depending on the requirements of the main motor M. The battery 8 is connected to an ECU (Electronic Control Unit) 9, and a residue signal is transmitted to the ECU 9. The main motor 9 is also connected to the ECU 9, and transmits a regeneration signal to the ECU 9.

Also connected to the ECU 9 is an accelerator angle sensor (not illustrated) provided in the accelerator pedal P, and it transmits an accelerator angle signal (hereunder referred to as "θ throttle signal", which is the injection volume target setting signal of the invention, from the accelerator pedal P to the ECU 9. When the driver (not illustrated) operates the accelerator pedal P, a rotation signal is transmitted to the main motor M according to the degree of operation.

Separately, an injection volume adjusting apparatus 42 is provided in the liquid fuel injection apparatus 40, and it adjusts the injection volume of the liquid fuel FL and is connected to the ECU 9. The θ throttle signal, residue signal and regeneration signal transmitted to the ECU 9 are transmitted to the injection volume adjusting apparatus 42.

The construction of the fuel evaporator 1 will now be explained with reference to FIG. 1 through FIG. 4.

As shown in FIG. 1 through FIG. 4, the fuel evaporator 1 is provided with an evaporator body 10. In the evaporator body 10 there is formed an evaporating chamber 11 that evaporates the liquid fuel FL by the heat received from the heated gas HG. A plurality of U-shaped heat medium tubes 12, 12 . . . through which the heated gas HG flows are situated in the evaporating chamber 11. Liquid fuel FL is injected by the liquid fuel injection apparatus 40 into the evaporating chamber 11. Also, the heated gas flowing through the heat medium tubes 12, 12 . . . transfers heat to the liquid fuel FL to evaporate the liquid fuel FL.

A catalytic combustor 20 is situated under the evaporator body 10. In the catalytic combustor 20 there is formed an inlet channel 21, through which off gas OG flows in, which is heated to serve as the heated gas HG, and a catalyst layer 22 is provided downstream from the inlet channel 21. A honeycomb-shaped carrier (not illustrated) supporting the metal component of the catalyst is provided in the catalyst layer 22, and reaction between the off gas OG and the catalyst heats the off gas OG into heated gas HG.

An outlet channel 23 is formed by a partition 24, downstream from the catalyst layer 22, and the heated gas HG passes through the outlet channel 23. The catalyst layer 22 and the heat medium tubes 12, 12 . . . in the evaporator body 10 are connected via this outlet channel 23 formed by the partition 24.

Figure 2:
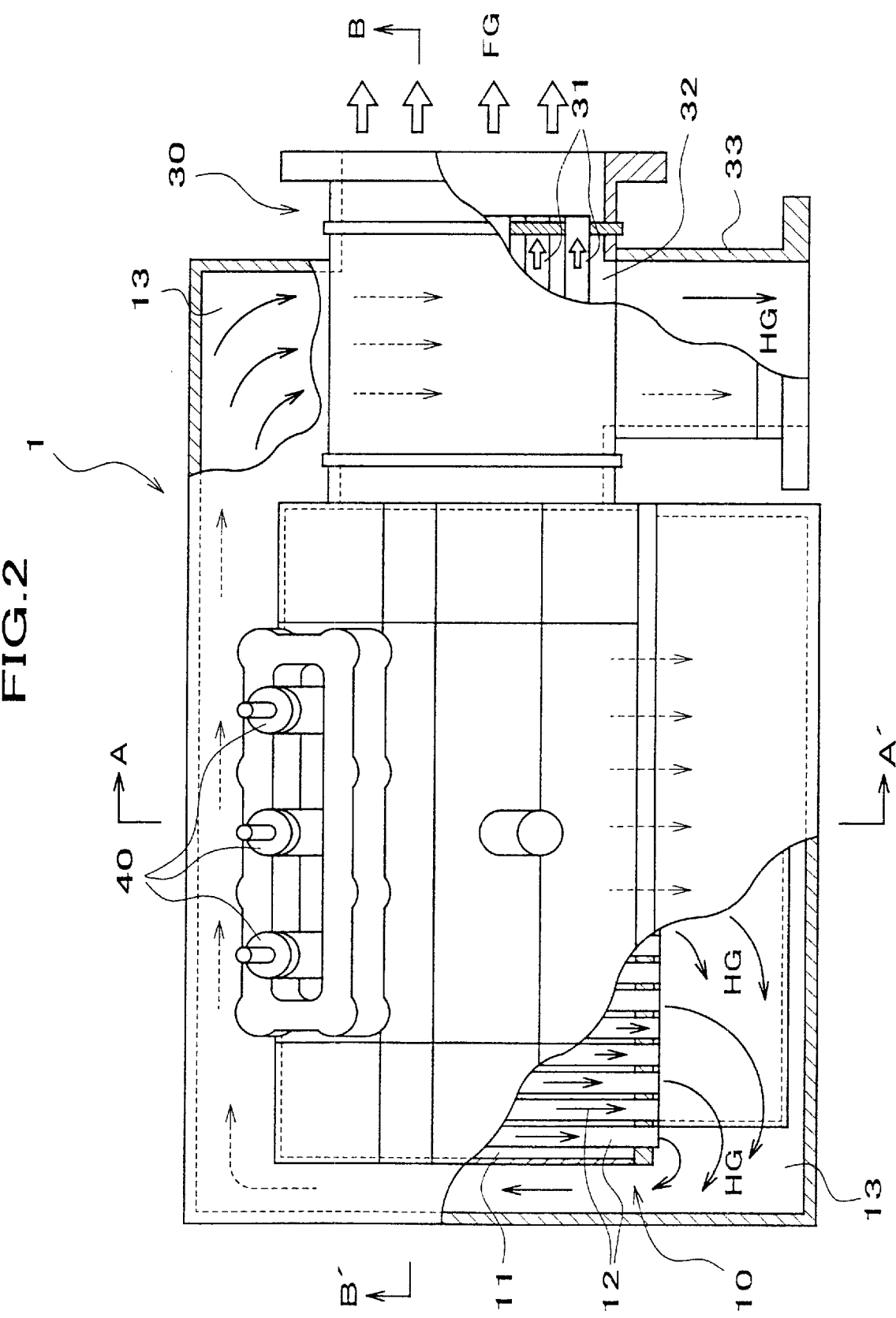
FIG. 2 is a partial cutaway plan view of a fuel evaporator according to the invention.
Figure 3:
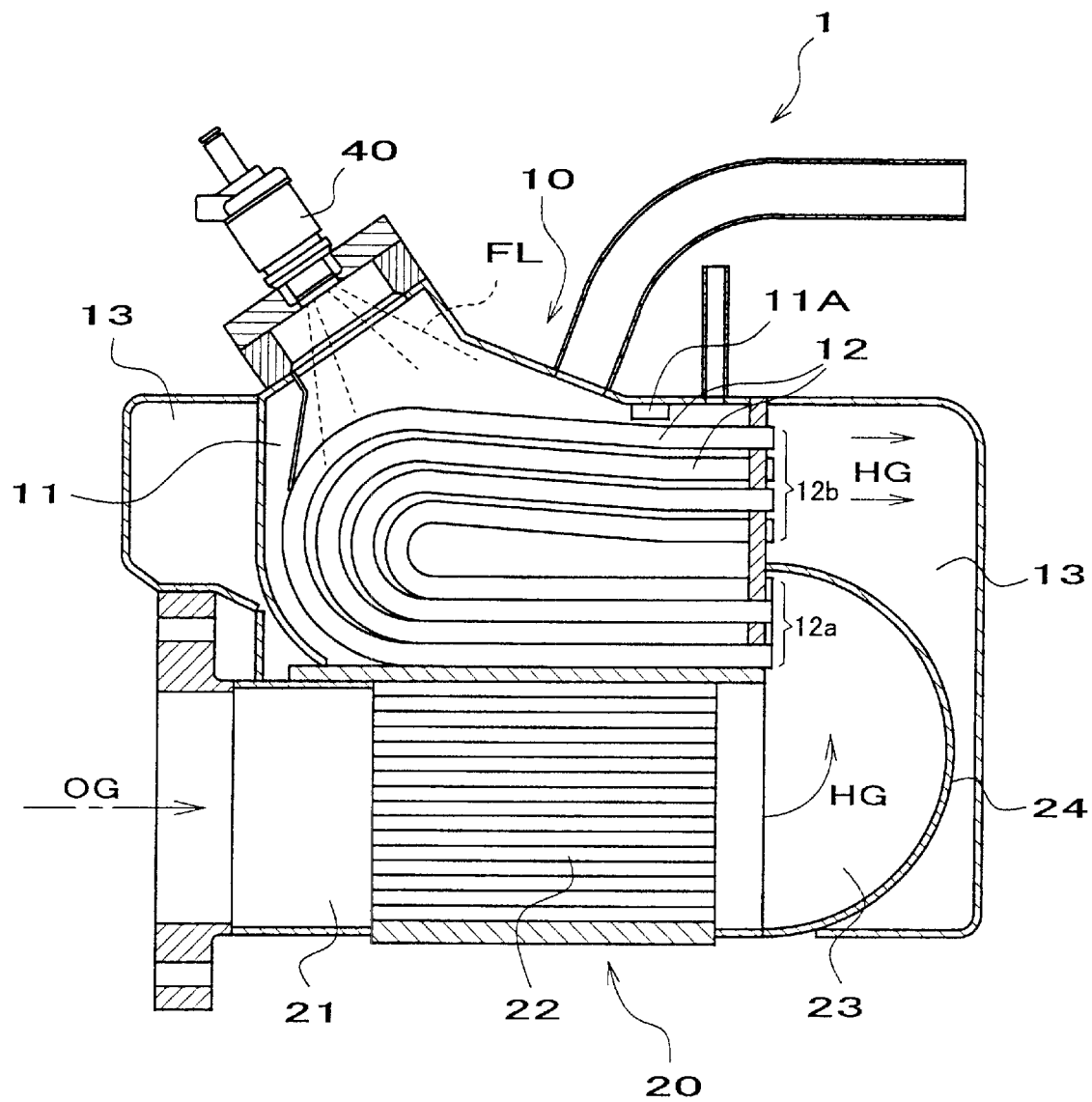
FIG. 3 is a cross-sectional view of FIG. 2 along line A—A'.

Downstream from the heat medium tubes 12, 12 . . . there is formed a heated gas conduit 13 through which the heated gas HG flows after it has passed through the heat medium tubes 12, 12 . . . and evaporated the liquid fuel FL. As shown in FIG. 2 and FIG. 3, the heated gas conduit 13 is arranged around the evaporating chamber 11 and is connected to the superheating portion 30.

Downstream from the evaporator body 10 there is also formed a superheating portion 30 which superheats the fuel gas FG evaporated at the evaporating chamber 11, by the heated gas HG through the heated gas conduit 13. A plurality of vapor tubes 31, 31 are arranged in the superheating portion 30, and the superheating chamber 32 surrounds them. Thus, the fuel gas FG flowing through the vapor tubes 31, 31 . . . is superheated by the heated gas HG flowing around the vapor tubes 31, 31 . . . Downstream from the vapor tubes 31, 31 . . . there is connected the reformer 2 shown in FIG. 1, and the superheated fuel gas FG is supplied to the reformer 2. An exhaust duct 33 is provided downstream from the superheating chamber 32, and the heated gas HG flows out through this exhaust duct 33.

Figure 5:
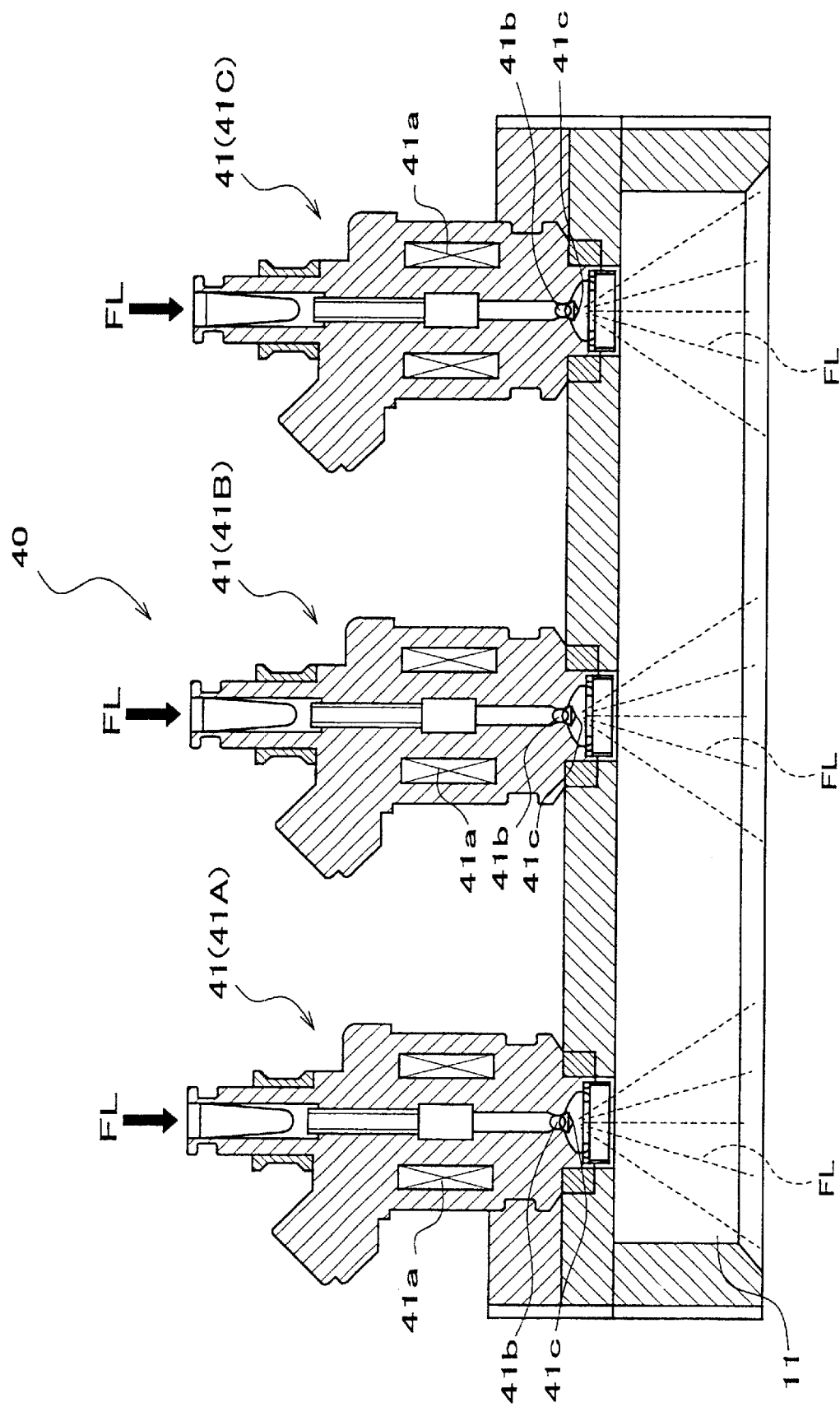
FIG. 5 is a cross-sectional view showing an evaporator liquid fuel injection apparatus according to the invention.

The fuel injecting apparatus 40 is provided with the injection volume adjusting apparatus 42 shown in FIG. 1, while also being provided with the three fuel injection portions 41, 41, 41 shown in FIG. 2 and FIG. 5. The liquid fuel is injected from some or all of these fuel injection portions 41, 41, 41. The fuel injecting apparatus 41 directs a current to a solenoid coil 41a to open a valve 41b, and the liquid fuel FL is injected from a fuel injection nozzle 41c. The liquid fuel FL which is a mixture of water and methanol is pressurized and sent from a tank T with a pump (see FIG. 1). The injected liquid fuel FL begins to disperse as it is released from the fuel injection nozzle 41c which has a small angle area.

Figure 4:
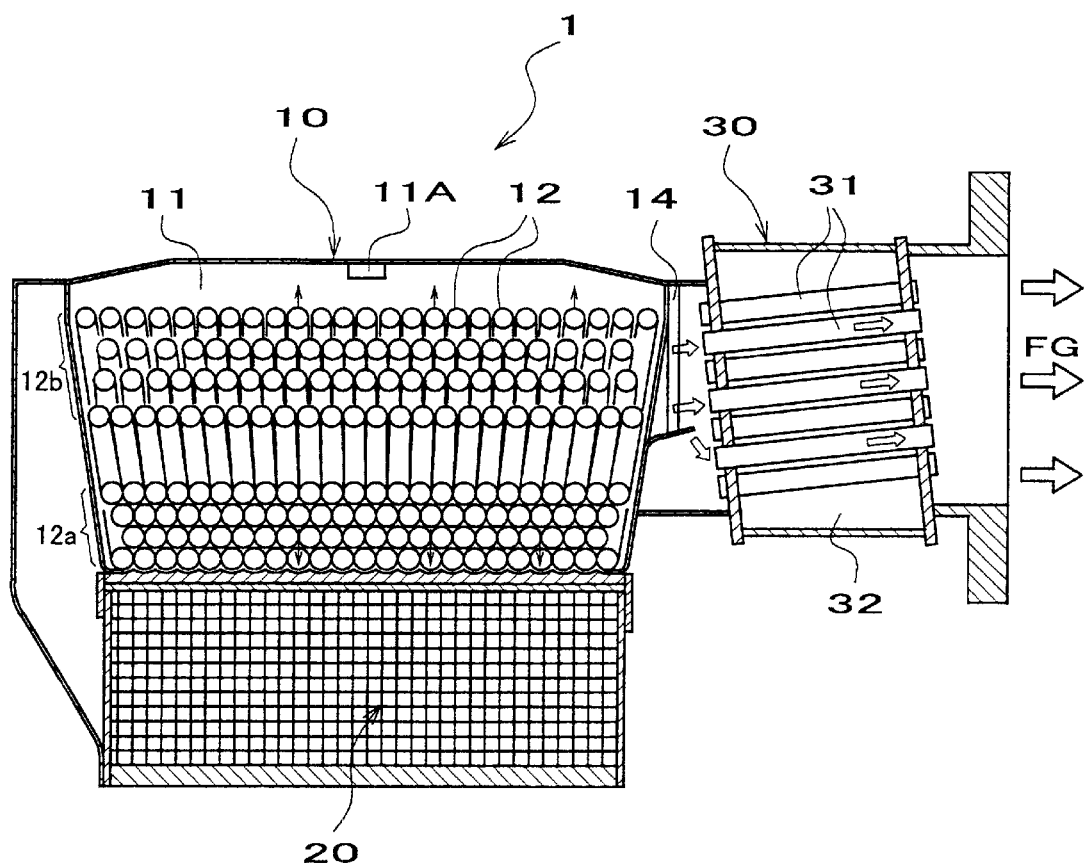
FIG. 4 is a cross-sectional view of FIG. 2 along line B—B'.

As shown in FIG. 3 and FIG. 4, a pressure sensor 11A is provided in the evaporator body 10 as a pressure detection means to detect the pressure in the evaporating chamber 11. The pressure signal serving as the command signal of the invention which is detected by the pressure sensor 11A, as shown in FIG. 1, is transmitted to the injection volume adjusting portion of the injection volume adjusting apparatus 42 provided in the liquid fuel injection apparatus 40. At the injection volume adjusting portion, the pressure signal is received from the pressure sensor 11A and the θ throttle signal, residue signal and regeneration signal are received from the ECU 9, and the injection volume is adjusted by changing the Ti value of the liquid fuel injection apparatus 40.

Although a pressure sensor is used as the pressure detection means according to this embodiment, a pressure regulator may also be used as the pressure detection means. In this case, a fuel return channel is used for pressure regulation of the fuel pressure by the pressure regulator. The fuel pressure is used as the command value for adjustment of the injection volume of the liquid fuel injection apparatus 40.

Figure 6:
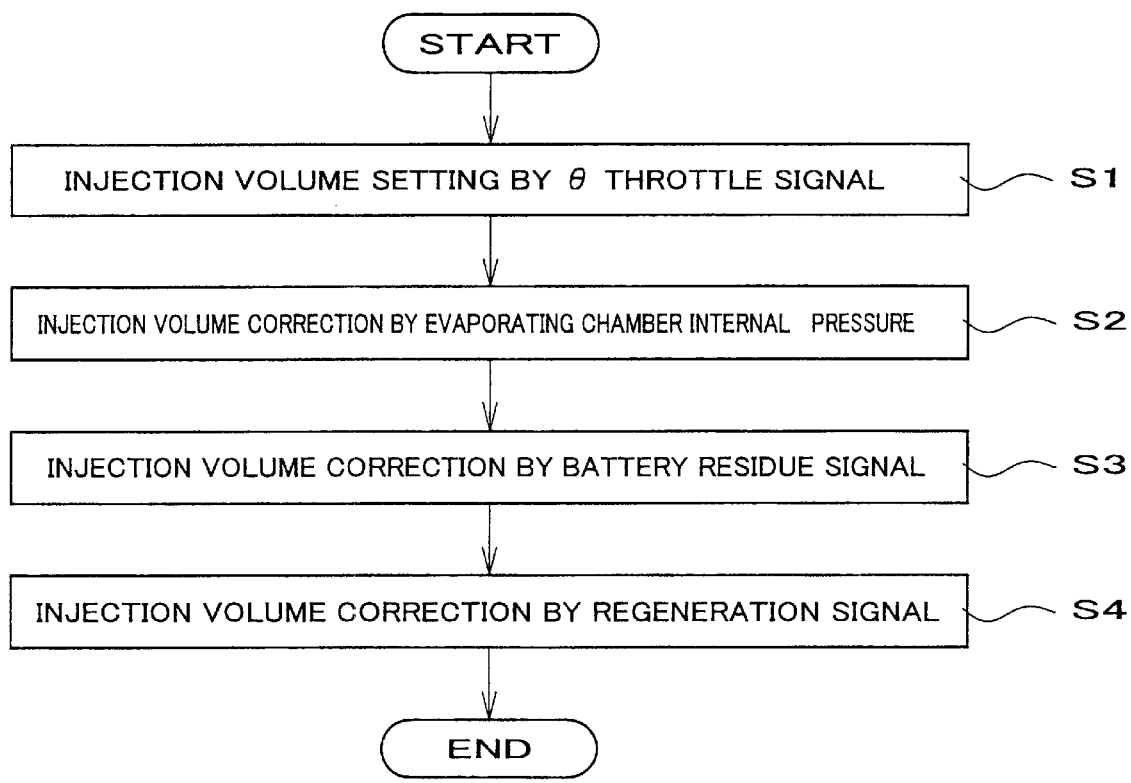
FIG. 6 is a flow chart showing control of an evaporator liquid fuel injection apparatus according to the invention.

The control of an evaporator liquid fuel injection apparatus having this construction will now be explained in greater detail with reference to the flow chart in FIG. 6.

In the liquid fuel injection apparatus 40 of the invention, the raw fuel is injected into the evaporating chamber 11 of the evaporator body 10, but the injection volume is adjusted by the fuel volume adjusting portion in the fuel volume adjusting apparatus 42. First, the injection volume target for the liquid fuel FL is set by the θ0 throttle signal received through the ECU 9 (step S1). The θ0 throttle signal is transmitted to the ECU 9 from an accelerator angle sensor (not illustrated) provided in the accelerator pedal P. When the driver (not illustrated) carries out a greater accelerator pedal operation, a large θ0 throttle signal is transmitted from the ECU 9 to the fuel volume adjusting apparatus 42. When the fuel volume adjusting apparatus 42 receives the large θ throttle signal, the injection volume of the liquid fuel injected from the fuel injection portions 41, 41, 41 in the liquid fuel injection apparatus 40 is adjusted to a greater volume in the injection volume adjusting portion. Meanwhile, when the driver carries out a smaller accelerator pedal operation, a small θ0 throttle signal is transmitted from the ECU 9 to the fuel volume adjusting apparatus 42. When the fuel volume adjusting apparatus 42 receives the small θ0 throttle signal, the injection volume of the liquid fuel injected from the fuel injection portions 41, 41, 41 is adjusted to a smaller volume in the injection volume adjusting apparatus 42. The injection volume of the liquid fuel injected from the fuel injection portions 41, 41, 41 is set by the fuel volume adjusting apparatus 42 in this manner.

For injection of the liquid fuel FL, it is preferred for most of the liquid fuel FL to be injected to the sections of the evaporating chamber 11 having greater heat. Specifically, the amount of heat is normally greater at the center of the evaporating chamber 11. Consequently, it is preferred to control the apparatus so that, of the three fuel injection portions 41, 41, 41 shown in FIG. 5, most of the liquid fuel FL is injected from the fuel injection portion 41B situated at the center. Alternatively, when the heat distribution in the evaporating chamber 11 changes for some reason, it is preferred for more of the liquid fuel FL to be injected to the sections of the evaporating chamber 11 where the amount of heat is greater, which may include either of the fuel injection portions 41A, 41C on either side.

After the injection volume target for the liquid fuel has been set by the θ throttle signal, the pressure signal from the pressure sensor 11A which measures the pressure in the evaporating chamber is received and the liquid fuel injection volume is corrected (step S2). In the fuel cell 5 that is connected to the evaporating chamber 11 via a reformer 2 or the like, the pressure difference between the hydrogen electrode and oxygen electrode undergoes an interelectrode pressure difference adjustment. The pressure in the evaporating chamber 11 is also changed by the effect of the interelectrode pressure difference adjustment in the fuel cell 5.

When the pressure in the evaporating chamber 11 has changed, it sometimes occurs that the heat is insufficient resulting in a lack of complete evaporation of the liquid fuel, or conversely, that the heat is in excess and the evaporation efficiency is reduced, if the liquid fuel injection volume is fixed. The pressure in the evaporating chamber 11 is therefore measured by the pressure sensor 11A. The pressure signal obtained by measurement at the pressure sensor 11A is then transmitted to the injection volume adjusting portion 42A in the injection volume adjusting apparatus 42. At the injection volume adjusting portion 42A, the pressure signal from the pressure sensor 11A is received and the injection volume of the liquid fuel FL injected from the liquid fuel injection apparatus 40 is corrected. For correction of the liquid fuel FL injection volume in cases where the pressure in the evaporating chamber 11 is low, the liquid fuel FL injection volume is corrected to a lower volume in order to prevent insufficient heat which would result in the liquid fuel being unevaporated. On the other hand, when the pressure in the evaporating chamber 11 is high, the liquid fuel injection volume is increased so as not to lose the heat.

After receiving the evaporating chamber 11 pressure signal from the pressure sensor 11A and correcting the fuel injection volume, the battery 8 residue signal is received and the liquid fuel FL injection volume is adjusted (step S3).

In a fuel cell-powered electric vehicle in which a fuel cell system FCS is mounted, an electric current is outputted from an energy buffer of the battery 8, etc. in situations where the main motor M requires a large current which exceeds the power generation of the fuel cell 5, such as during starting or rapid acceleration. It is therefore preferred for the battery 8 to always be fully charged, but the residual charge is sometimes reduced, such as after a current has been supplied to the main motor M. The residue in the battery 8 is therefore detected, and the injection volume of the liquid fuel FL injected into the evaporator is increased and reduced to increase and decrease the power generation by the fuel cell 5 in response to the residue.

The amount of residual charge in the battery 8 is transmitted to the ECU 9 as a residue signal. The ECU 9 transmits the residue signal received from the battery 8 to the injection volume adjusting apparatus 42 and a current adjusting portion 5A in the fuel cell 5. The injection volume adjusting apparatus 42 which has received the residue signal corrects the injection volume of the liquid fuel FL at the injection adjusting portion 42A based on the residue signal. At the current adjusting portion 5A in the fuel cell 5, the residue signal is received from the ECU 9 and the current of the fuel cell 5 is adjusted.

When the ECU 9 has received a residue signal indicating that the battery current is insufficient, the signal is transmitted to the injection volume adjusting apparatus 42 and the current adjusting portion 5A of the fuel cell 5. Since it is preferred to increase the current of the fuel cell 5 when the battery residue is insufficient, the fuel injection volume is corrected by the injection volume adjusting apparatus 42 to increase the injection volume of the liquid fuel FL from the liquid fuel injection apparatus 40. Meanwhile, the current adjusting portion 5A is adjusted to increase the current of the fuel cell 5.

Conversely, when the ECU 9 has received a residue signal indicating that the battery charge is full, there is no need to increase the current for the fuel cell 5. Consequently, transmission of the residue signal from the ECU 9 to the injection volume adjusting apparatus 42 and the current adjusting portion 5A of the fuel cell 5 may be prevented. Alternatively, the residue signal may still be transmitted but without changing the injection volume of the liquid fuel injection apparatus 40 at the injection volume adjusting apparatus 42 and without increasing the current of the fuel cell 5 at the current adjusting portion 5A of the fuel cell 5.

After the fuel injection volume has been corrected based on the residual charge of the battery 8 and the current of the fuel cell 5 has been adjusted, the regeneration signal is received and the injection volume of the liquid fuel FL is corrected (step S4).

At the fuel cell system FCS, the main motor M will sometimes be in a regenerated state, and if more current is generated from the fuel cell 5 than necessary when the main motor M is in a regenerated state, useless electricity will be generated. In order to avoid such generation of useless electricity when the main motor M is in a regenerated state, the current of the fuel cell 5 is adjusted lower by the current volume adjusting portion 5A while the injection volume of the liquid fuel FL injected to the evaporator is also reduced, to reduce the current of the fuel cell 5.

The regeneration signal which determines whether or not in a regenerated state is transmitted from the main motor M to the ECU 9. The ECU 9 transmits the regeneration signal received from the main motor M to the injection volume adjusting apparatus 42 and the current adjusting portion 5A of the fuel cell 5. The injection volume adjusting apparatus 42 that has received the regeneration signal corrects the injection volume of liquid fuel FL at the injection volume adjusting portion according to the regeneration signal. At the current adjusting portion 5A of the fuel cell 5, the regeneration signal from the ECU 9 is received and the current of the fuel cell 5 is adjusted.

When the ECU 9 has received a regeneration signal that indicates a regenerated state, the regeneration signal is transmitted to the injection volume adjusting apparatus 42 and the current adjusting portion 5A of the fuel cell 5. In the case of a regeneration state, the current of the fuel cell 5 is reduced, while the fuel volume adjusting apparatus 42 makes a correction to reduce the injection volume of liquid fuel injected from the fuel injection apparatus. In the case of a state not in the regeneration state, no correction is made to the injection volume of the liquid fuel, and the apparatus is controlled to inject the same injection volume of liquid fuel from the fuel injection apparatus. The injection volume of the liquid fuel injection apparatus 40 is corrected by the injection volume adjusting apparatus 42 in this manner.

A second embodiment of the invention will now be explained.

Figure 7:
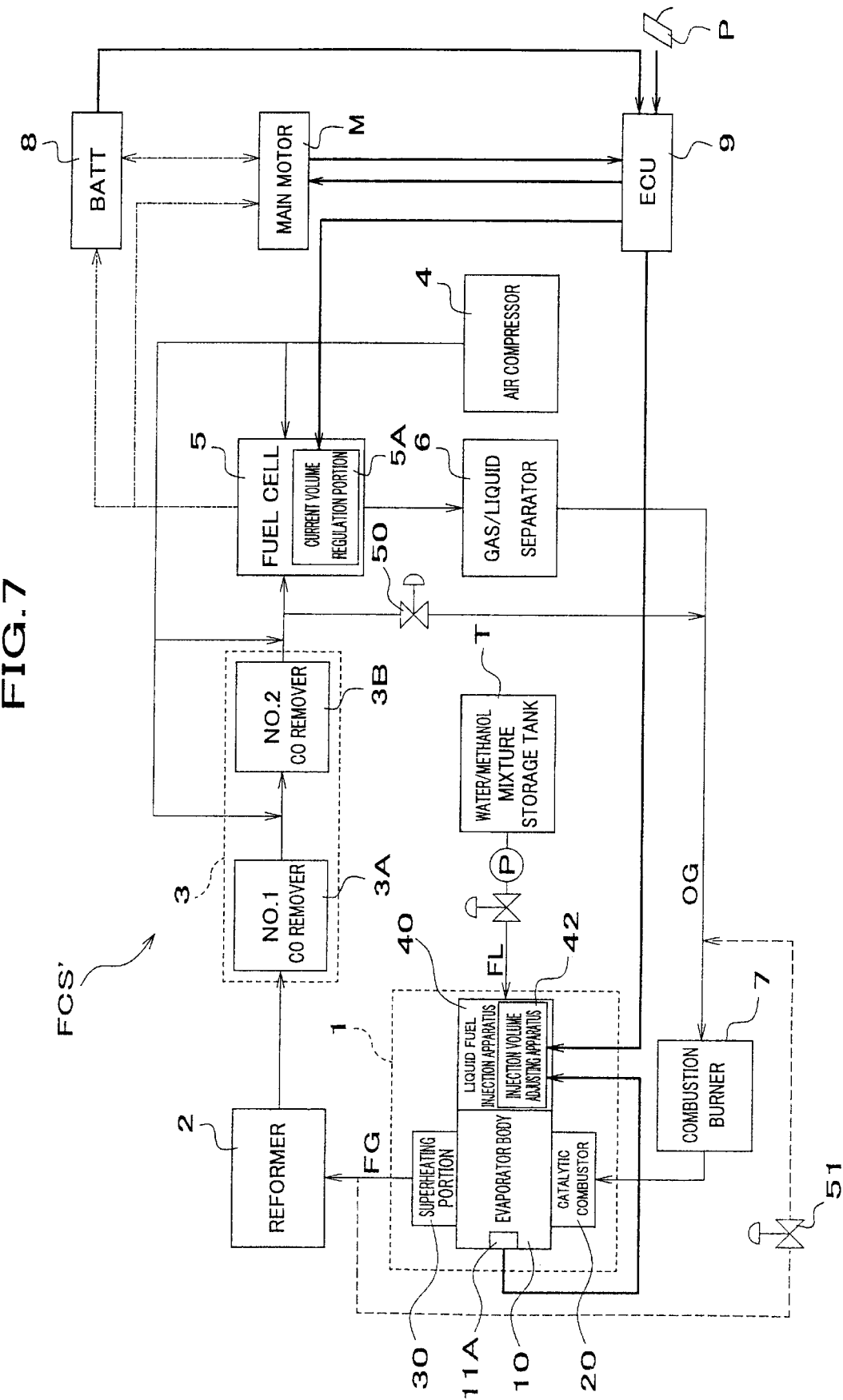
FIG. 7 is a constructional diagram of the overall construction of a fuel cell system provided with an evaporator liquid fuel injection apparatus according to a second embodiment of the invention.
Figure 8:
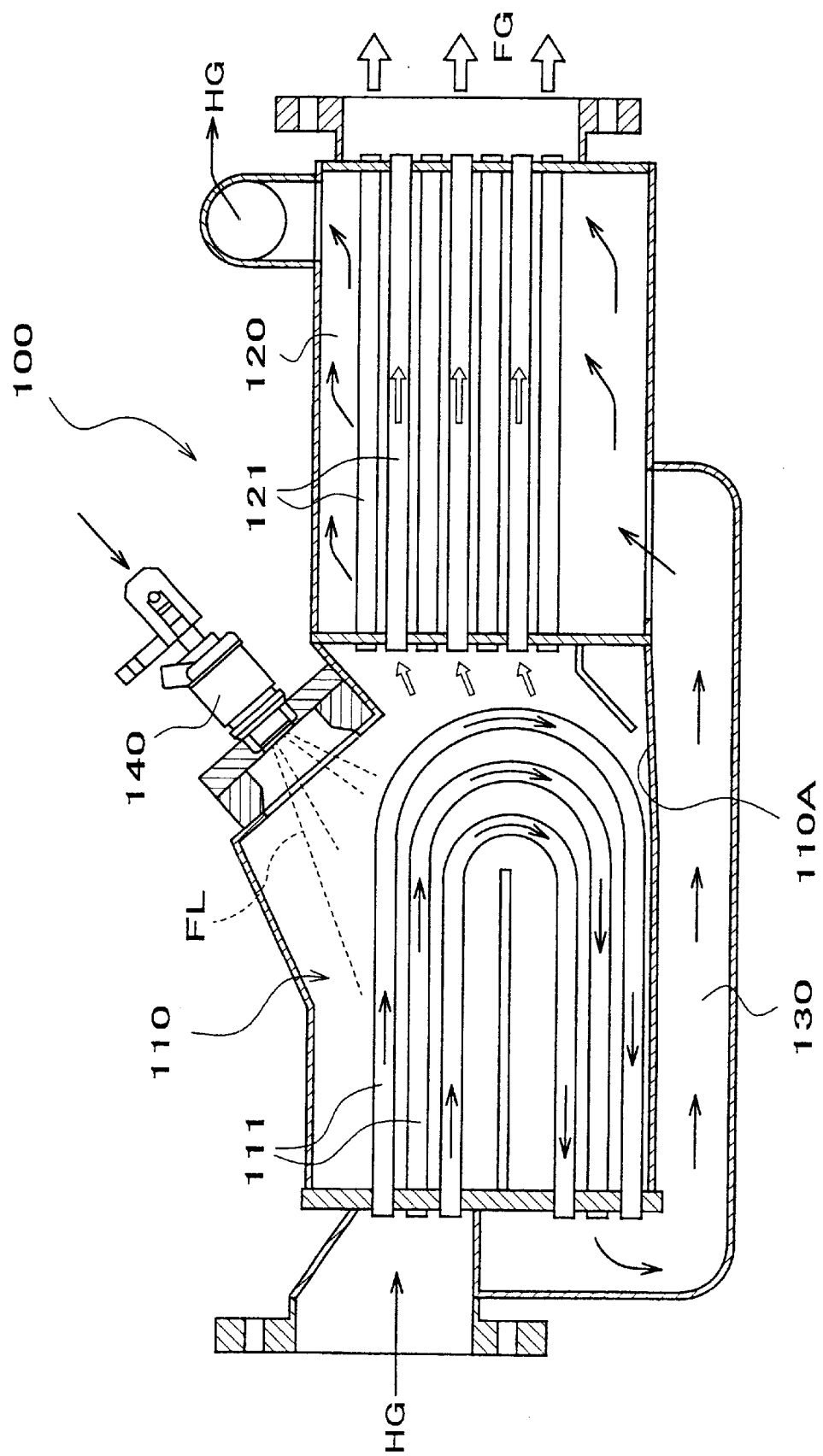
FIG. 8 is a front cross-sectional view of a conventional fuel evaporator.

FIG. 7 shows a fuel cell system FCS' provided with an evaporator liquid fuel injection apparatus according to this embodiment. The members of the fuel cell system FCS' of this embodiment that are identical to those of the fuel cell system FCS of the previous embodiment will be indicated by the same reference numerals, and their explanation will be omitted.

As shown in FIG. 7, the CO remover 3 in the fuel cell system FCS' of this embodiment has a branched channel connected to the hydrogen electrode end of the fuel cell 5, and a back pressure valve 50 is provided at the branched section. The back pressure valve 50 is able to adjust the opening angle based on the control signal from the ECU 9. Adjustment of the opening angle allows adjustment of the amount of fuel gas mixed into the off gas, which is discharged from the gas/liquid separating apparatus 6.

The process of fuel injection volume adjustment in this fuel cell system FCS' will now be explained.

It is detected whether the fuel cell-powered electric vehicle is undergoing rapid acceleration based on the θ0 throttle signal of the accelerator pedal P received by the ECU 9. In the absence of rapid acceleration, no rapid acceleration signal is transmitted to the current adjusting portion 5A, back pressure valve 50 and injection volume control apparatus 41 of the fuel cell 5. The injection volume of liquid fuel FL injected from the fuel injection portions 41, 41, 41 of the liquid fuel injection apparatus 40 is directly adjusted also by control of an evaporator liquid fuel injection apparatus such as illustrated by the first embodiment, for example.

In contrast, when a situation of rapid acceleration is detected by the θ0 throttle signal at the ECU 9, the rapid acceleration signal is transmitted to the current adjusting portion 5A of the fuel cell 5. At the current adjusting portion 5A, the rapid acceleration signal is received, and the fuel cell 5 is controlled to reduce power generation and lower the current supply. The rapid acceleration signal is also transmitted to the back pressure valve 50. At the back pressure valve 50, the rapid acceleration signal is received and the angle is widened. This reduces the amount of fuel gas required since power generation has been reduced at the fuel cell 5. By opening the back pressure valve 50 by that amount, the volume of off gas OG supplied to the catalytic combustor 20 is increased.

The rapid acceleration signal is also transmitted to the injection volume adjusting portion 40A. At the injection volume adjusting portion 40A that has received the rapid acceleration signal, control is effected to increase the injection volume of the liquid fuel. At this time, since the opening angle of the back pressure valve 50 has been widened, a larger volume of off gas OG is supplied to the catalytic combustor 20 than when no rapid acceleration signal has been transmitted. Consequently, when the injection volume from the fuel injection portions 41, 41, 41 has been increased, a greater amount of heat is applied to correspond to the degree of increase, and that much more liquid fuel can therefore be evaporated.

Here, since the amount of fuel gas used in the fuel cell 5 is reduced, less current is supplied from the fuel cell 5, and insufficient power is generated. The battery 8 compensates for the insufficient power. The current is supplied from the battery 8 for this purpose.

Another modification of the fuel cell system FCS' shown in FIG. 7 is a mode in which a fuel gas channel is formed as indicated by the dotted line in FIG. 7, and the back pressure valve 51 may be provided in the fuel gas channel. In this mode, by operation of the back pressure valve 51, the fuel gas discharged from the fuel evaporator 1 is supplied to the combustion burner 7 or the catalytic combustor 20, thus improving the combustion performance. In this case, there is no reduction in fuel gas utilization efficiency in the fuel cell 5.

The fuel gas channel which supplies fuel gas to the combustion burner 7 according to this mode has its end starting downstream from the fuel evaporator 1, but it may alternatively have its end starting downstream from the combustor 2 and CO remover 3.

Preferred embodiments of the invention have been explained above, but the invention is not limited to these embodiments. For example, for control of the injection volume of the liquid fuel in the first embodiment, it is necessary to set the liquid fuel injection volume using the pressure signal and to correct the injection volume by the θ throttle, but any steps may arbitrarily be employed for correction of the injection volume by the energy buffer residue signal and regeneration signal.

Also, three fuel injection portions have been provided in this fuel injection apparatus, but one, two or four injection portions may be used. When a plurality of fuel injection portions is provided, the design may be such that the liquid fuel is evenly injected from each fuel injection portion.

Furthermore, the energy buffer may also be a capacitor instead of the battery used in the aforementioned embodiments.

As explained above, the present invention is designed to allow efficient evaporation of liquid fuel by injection of a suitable volume of liquid fuel corresponding to the requirements of fuel cell-powered electric vehicles.

Furthermore, it performs satisfactorily when it is desired to rapidly supply fuel to the fuel cell in such situations as rapid acceleration of the fuel cell-powered electric vehicle, while also efficiently evaporating supplied liquid fuel and thus preventing formation of liquid pools in the evaporating chamber.

What is claimed is:

1. An evaporator liquid fuel injection apparatus for a fuel evaporator in a fuel cell system, comprising:

an evaporating chamber that evaporates liquid fuel with a heat medium into fuel gas;

a pressure detection means for detecting pressure in said evaporating chamber;

a liquid fuel injection apparatus for injecting said liquid fuel into said evaporating chamber;

an injection volume adjusting apparatus for adjusting a liquid fuel injection volume of the liquid fuel injection apparatus; and an injection volume adjusting portion provided in said injection volume adjusting apparatus for adjusting said liquid fuel injection volume based on at least a command value received from said pressure detection means.

2. An evaporator liquid fuel injection apparatus according to claim 1, wherein said fuel cell system is located in a fuel cell-powered electric vehicle, and said injection volume adjusting portion additionally adjusts said liquid fuel injection volume based on a throttle signal.

3. An evaporator liquid fuel injection apparatus according to claim 2, wherein said injection volume adjusting portion additionally adjusts said liquid fuel injection volume based on a residue signal.

4. An evaporator liquid fuel injection apparatus according to claim 2, wherein said injection volume adjusting portion additionally adjusts said liquid fuel injection volume based on a regeneration signal.

5. An evaporator liquid fuel injection apparatus according to claim 3, wherein said injection volume adjusting portion additionally adjusts said liquid fuel injection volume based on a regeneration signal.

6. An evaporator liquid fuel injection apparatus according to claim 1, wherein said fuel cell system is located in a fuel cell-powered electric vehicle, and said injection volume adjusting portion additionally adjusts said liquid fuel injection volume based on an residue signal.

7. An evaporator liquid fuel injection apparatus according to claim 1, wherein said fuel cell system is located in a fuel cell-powered electric vehicle, and said injection volume adjusting portion additionally adjusts said liquid fuel injection volume based on an regeneration signal.

* * * * *